(No Model.) 3 Sheets—Sheet 1.
J. F. STEWARD.
HARVESTER REEL DRIVING MECHANISM.
No. 391,095. Patented Oct. 16, 1888.
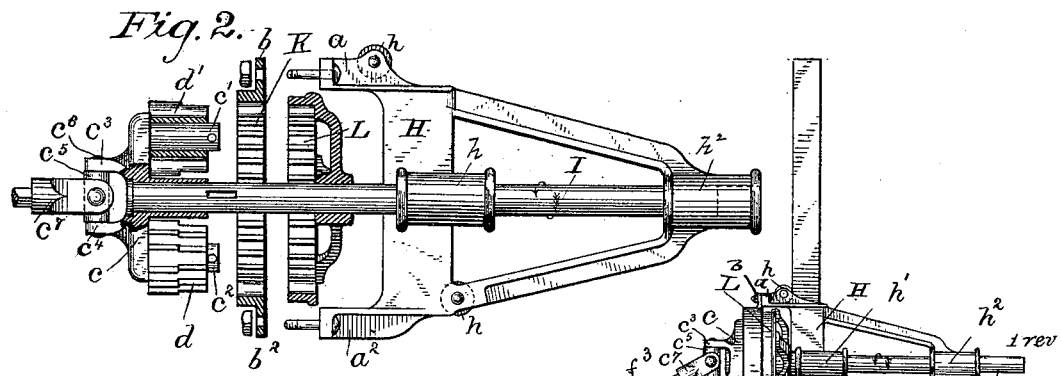
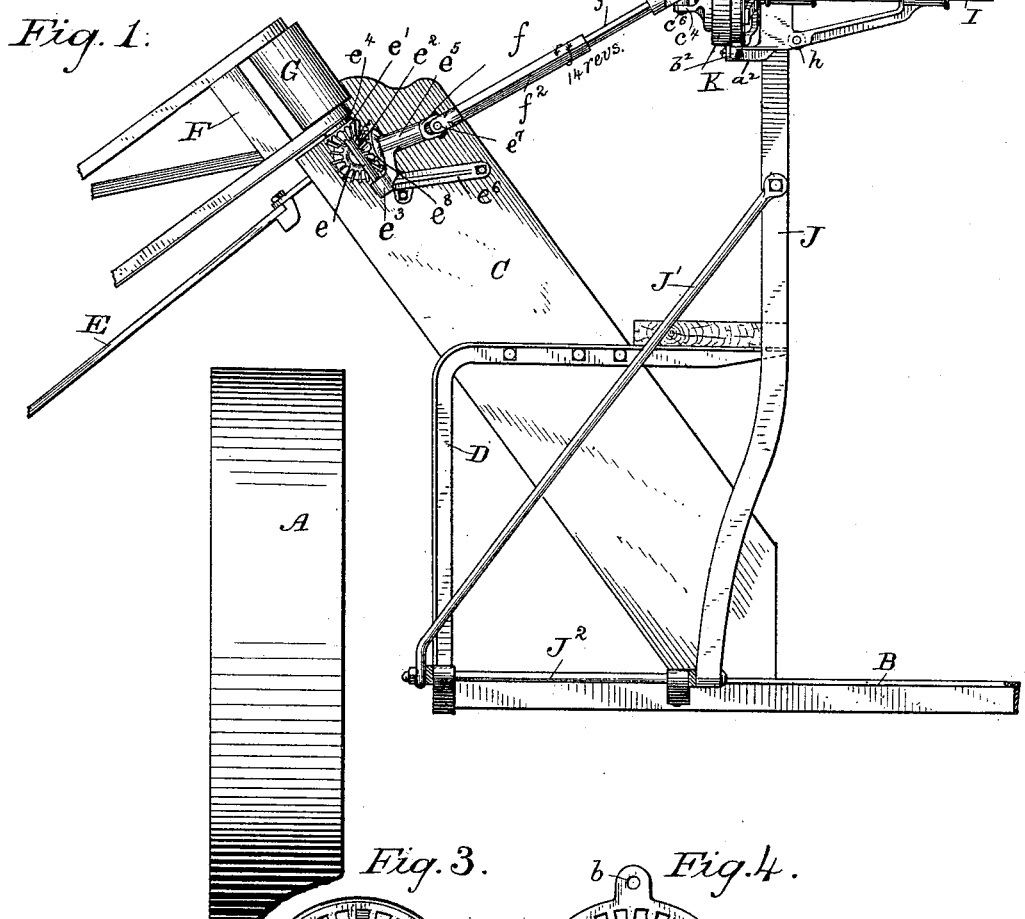
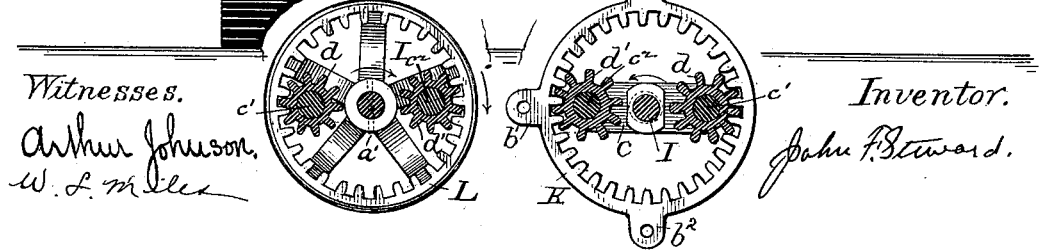
Witnesses. Arthur Johnson. W. L. Miller.
Inventor. John F. Steward.

(No Model.) 3 Sheets—Sheet 2.

J. F. STEWARD.
HARVESTER REEL DRIVING MECHANISM.

No. 391,095. Patented Oct. 16, 1888.

Witnesses.
W. W. Mortimer
W. R. Kennedy

Inventor,
J. F. Steward,
By Phil. T. Dodge,
Attorney.

(No Model.) 3 Sheets—Sheet 3.
J. F. STEWARD.
HARVESTER REEL DRIVING MECHANISM.

No. 391,095. Patented Oct. 16, 1888.

Witnesses:
Arthur Johnson
F. Stanley Elmon

Inventor:
J. F. Steward
By his Atty.
Phil. T. Dodge

UNITED STATES PATENT OFFICE.

JOHN F. STEWARD, OF CHICAGO, ILLINOIS.

HARVESTER-REEL-DRIVING MECHANISM.

SPECIFICATION forming part of Letters Patent No. 391,095, dated October 16, 1888.

Application filed March 8, 1888. Serial No. 266,520. (No model.)

*To all whom it may concern:*

Be it known that I, JOHN F. STEWARD, of Chicago, county of Cook, and State of Illinois, have invented certain new and useful Improvements in Harvester-Reel-Driving Mechanisms, of which the following is a full description, reference being had to the accompanying drawings, of which—

Figure 5:
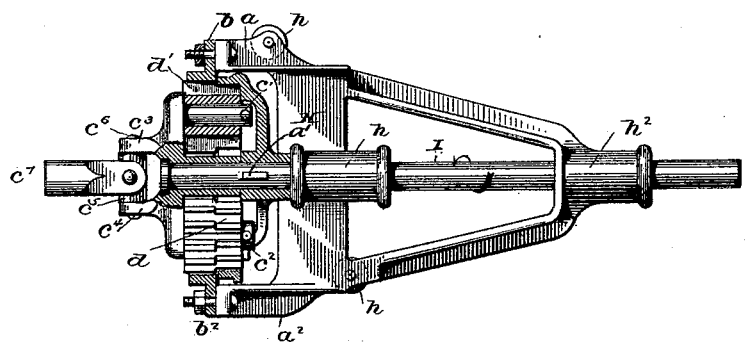
Figure 6:
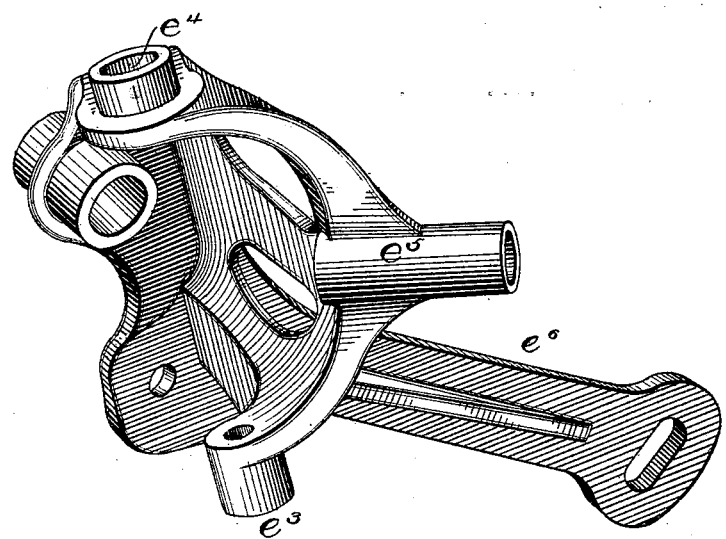

Figure 1 is a front elevation; Fig. 2, an axial sectional view of the gearing, showing its relation to the reel-shaft and reel-bracket. Fig. 3 is a view of the reel-driving gear and the pinions which actuate it; Fig. 4, a view of the fixed gear and the pinions as shown in Fig. 3 and the arms which give them an orbital movement to cause them to engage with and be rotated by the fixed gear. Fig. 5 is a front elevation, partly in section, of the reel-shaft bearing and the gearing and other parts immediately connected therewith. Fig. 6 is a perspective view of a shaft bearing or support used on the elevator-frame.

The object of this invention is to reduce the amount of gearing required to operate a reel-shaft, and also to simplify the connecting devices by which motion is transmitted to it from a rotating shaft upon the harvester-frame. In many harvesters a special shaft is provided, crossing the elevator-frame from rear to front, driven at the rear from the harvester-gearing, (which is usually located at that point,) and connected at its front with the reel. In this machine, however, one of the elevating-rollers is taken advantage of to operate the reel, and the reel is driven directly from it. In an ordinary harvester the canvas drums are about three inches in diameter, and, in order to carry the elevating-canvas at a proper rate, must rotate at a given rate. Machines vary very much, and it is necessary, in order to make this machine understood, to assume a given rate of rotation of the shaft relative to that at which the reel is to be driven. I will assume in this case that the reel-shaft should make one revolution while the shaft from which power is taken—in this case the elevator-drum shaft—is making fourteen. It is then necessary to use speed-reducing gearing, which I do, taking advantage of the principle involved in what are known as "differential gears," as will be fully described.

In the drawings, A is the master-wheel, (simply shown in Fig. 1 to give its position relative to the other parts, which represent the main frame,) B being the finger-bar, C the elevator-front board, and D the support for the seat-board and for the elevator-frame as well.

E is the deck of the binder; F, the frame for the grain-adjusting endless canvas; G, the drum for operating the butt-adjusting canvas.

H is the bracket or bearing in which the reel-shaft is supported.

I is the reel-shaft.

J is the reel post or standard, J' the post-brace, and $J^2$ a long bolt forming the axis of vibration for the reel-post at its foot.

The reel-post may be made of angle-iron or square, preferably the former. It may be controlled by any of the usual methods, preferably by means of the system of leverages shown in my patent, No. 346,272, dated July 27, 1886. It is sufficient only to say in this case that the reel-bracket is adapted to move up and down on the post and fore and aft with the latter.

The gearing herein to be described may be adapted to any form of reel-support. It is but necessary that the stationary gear be fixed from rotation by being connected with the bearing of the reel shaft or lever or any other reel-support.

The reel-bracket consists of the sleeve H, cored through vertically or otherwise and adapted to clasp the post J. Anti-friction rollers $h$ and $h$ are provided to track upon the stubble side of the post J above and the grain side of the same below, because, on account of the reel, (not shown,) the preponderance of weight is such as to cause the bracket to bear at those points. This bracket is provided with the bearings $h'$ and $h^2$, the latter being supported by arms reaching thereto from the body of the bracket. In these bearings the reel-shaft is free to rotate. Stubbleward from the main sleeve of the bracket I project two or more short strong arms, $a$ $a^2$, each forming lugs through which bolts may pass, preferably in a direction parallel with the reel-shaft.

K is an internal gear having in this case thirty teeth and provided with the peripheral lugs $b$, $b'$, and $b^2$, having bolts passing through, which secure it firmly to the reel-bracket, as is shown in Fig. 1. In Fig. 2 the parts are all shown in their position, but this gear moved to the left, so as to show clearly the arrangement of the parts on the bracket and around the shaft.

$c$ is a hub provided with two strong arms having studs $c'$ and $c^2$, parallel with the axis of the reel shaft, as shown in Fig. 2, which support two pinions, $d\ d'$, and which rotate freely thereon, being held by spring cotters or otherwise. The stationary internal gear, K, is concentric with the reel-shaft, and its pitch-circle diameter is such and the diameter of the pinions and the radial distance from the axis of the shaft such that they shall mesh properly therewith. This armed hub is also provided with lugs $c^3$ and $c^4$, which span the swivel-piece $c^5$, held between the lugs by the pin $c^6$.

$c^7$ is the crotched end of the shaft, which also spans the swivel piece $c^5$. These last pieces constitute a knuckle-joint in the shaft. The whole of this mechanism last described is free to rotate loosely upon the reel-shaft, while the reel-driving gear L is pinned thereto, as shown at $a'$, Fig. 5. When in position for work, (that shown in Fig. 1,) it will readily be understood that if the reel-gear L and the stationary gear K had the same number of teeth, and the loose hub $c$ revolved, the pinions while moving in their orbits would but be rotated upon their axes without rotating gear L in either direction. Before going further, for clearness, I will say that but one pinion and one rotating arm may be used. I deem it preferable, however, to use two, because one balances the other, so that their rapid orbital rotation produces no shaking or unnecessary noise, and, further, because if the labor is shared by the added one the wear becomes less.

In describing the operation, however, I will treat the matter as if but one pinion were used, and consider it to be the one lettered $d$, and thus avoid confusion. In order that the pinion $d$, while moving in its orbit with the loose hub $c$, and acquiring rotation on its own axis in a direction reverse to that of the hub $c$ by meshing into the fixed gear K, may impart the slow motion to the gear L on the reel-shaft, I give the latter one-fifteenth less number of teeth—that is to say, twenty-eight teeth—and cause the pinion $d$, by making it of double length, to mesh therein. As the circle of the gear L is slightly less than that of the fixed gear, the pinion is in this case reduced in size where it engages therewith; but the number of teeth remain. In order to make the operation of these gears intelligible, I will treat them as performing the functions of ordinary gears. Assume, for a moment, that the gear K rotates in the direction opposite to that in which the reel-shaft is designed to rotate. Assume, also, that the pinion is free to revolve on a fixed axis, receiving motion through the teeth on its larger end from gear K, and communicating motion from the teeth on its smaller end to gear L. We will then have $\frac{30}{10} \times \frac{10}{28} = \frac{15}{14}$, K thus making fifteen revolutions backward, while L would be making fourteen. The fact is, however, that the pinions are not mounted on fixed axes and that the gear K does not rotate. On the contrary, the gear K is fixed and the pinions are arranged to pursue an orbital course around the axis of gear K, the pinions being carried bodily forward in a circular path, while at the same time they receive motion about their individual axes, owing to their engagement with the fixed gear. As regards the differentiation of movement, the conditions are, however, the same as in the formula above given. The gear L, instead of being rotated backward a distance of two teeth, is, in fact, turned forward a distance of two teeth during each orbital revolution of the pinion. There being twenty-eight teeth on gear L, fourteen rotations of the pinion $d$ in its orbit will cause the reel gear L to make one complete revolution.

It will thus be seen that the speed is reduced from the rapidly-running shaft to a proper amount of the reel-shaft with but two internal gears and a single orbitally-moving pinion. It may be advantageous in some cases to slightly modify this. For instance, the same end may be reached as follows: If K is 30 and $d$ is 10 and L is 28 and the smaller portion of $d$ be made to have fourteen teeth, we would then have $\frac{30}{10} \times \frac{10}{28} = \frac{15}{14}$. The reel-gear would thus make fifteen-fourteenths of a rotation while the pinion $d$ was moving in its orbit but once. This last is what is known as the "differential principle," the pitch-circles of K and L being of equal diameter, but the gears L being pitched with less teeth and the pitch-length being one-fifteenth less than that of the gear K.

I have thus stated three modifications in the relative numbers of the teeth for the various gears. Other modifications in the proportions of the gears and pinions may be used.

$e$ is a bevel-gear upon the front end of the shaft of the canvas-driving mechanism. $e'$ is a bevel-gear adapted to mesh therein and is mounted upon the shaft $e^2$ of the butt-adjusting canvas drum G. This shaft is supported in bearings $e^3$ and $e^4$, which are cast as one piece with the piece $e^5$ and the extended portion $e^6$, by which the said cast-metal frame is secured to the front wall, $c$, of the elevator-frame. In the bearings $e^5$ is a short shaft, $f$, upon one end of which is a beveled gear, $e^8$, which is adapted to mesh into the bevel-gear $e$. The grain end of this shaft $f$ is forked to receive and is pivoted to a knuckle-piece, $e^7$, which latter is seated within and pivoted to the forked end of a square tubular shaft, $f^2$. A third shaft, $f^3$, of square form, slides freely within and receives motion from the shaft $f^2$. This third shaft has at its grain end the forked portion $c^7$, connected, through the knuckle-joint heretofore described, with the pinion-carrying hub $c$. It will thus be observed that the reel-driving mechanism is adapted to be actuated by bevel-gear $e$, which performs the double duty of reel-driving and moving the grain-adjuster drum.

I provide the end of the reel-shaft with a head, as shown in Fig. 2, which prevents the hub C, which carries the pinions, from drawing off from the end of the said shaft.

As it is but essential that the hub which carries the two pinions be driven at the proper rate of speed, I do not confine myself to connecting with it by means of knuckle-joints, because, as will be readily understood, it may be given rotation in any manner. I trust this is so plain that it is not necessary for me to show as modifications the hub provided with teeth to be engaged by another gear or with sprockets to receive a chain.

What I claim as my invention, and desire to secure by Letters Patent, is—

1. In a harvester, the reel-standard J, hinged to swing forward and backward, the bracket or bearing H, sustained by and adjustable vertically upon said standard, the reel-shaft mounted in said bracket, the internally-toothed wheel L, fixed to the shaft, the internally-toothed wheel K, of a different diameter, fixed to the bracket, the pinion d, engaging both wheels, the revoluble hub c, provided with the journal to carry the pinion, and a driving-shaft, f, connected by a universal joint to said hub.

2. The reel-shaft bearing-bracket, in combination with the reel-shaft mounted therein and provided with the flange or head at its end, the hub c, mounted loosely on the shaft and retained in place by the flange, the driving-shaft, the universal joint connecting the same with the hub, the pinion of two diameters carried by the hub, the internal gear, L, fixed to the reel-shaft, and the non-rotating gear having a greater number of teeth than gear L.

3. In a harvester-reel, the reel-bracket H, having bearings for the reel-shaft, and supports for the fixed gear extending therefrom and provided with space therein for the gear L, by which the reel-shaft is rotated, all combined substantially as described.

4. In a harvester-reel, the metal frame having bearings $e^3$, $e^4$, and $e^5$, adapted to receive the shaft $e^2$ of the butt-adjuster driving mechanism, and the reel-driving shaft $f$, the said shafts provided with gears adapted to mesh into and be driven by the gear $e$, the reel adapted to be adjusted in its position relative to the said driving-gearings, and flexible connecting mechanism adapted to transmit motion from the gear $e$ to the said adjustable reel, all combined substantially as described.

5. In a harvester, the reel-shaft and a gear fixed thereon, a second and stationary gear fixed adjacent to and substantially concentric with the first-named gear, a pinion engaging both of said gears, said pinion and gears proportioned as described to give a differential motion, and a pinion-carrier, $c$, revolving about an axis substantially coincident with that of the gear, in combination with the pinion $e$, attached to the elevator-roll, the second pinion, $e^8$, engaging therewith, its shaft, the stationary bearing for said shaft, and the extensible shaft $f^2 f^3$, flexibly jointed to the last-named pinion-shaft and to the pinion-carrier $c$.

JOHN F. STEWARD.

Witnesses:
ALICE H. WARE,
W. L. MILES.